(12) United States Patent
Ciarfello

(10) Patent No.: US 7,841,644 B1
(45) Date of Patent: Nov. 30, 2010

(54) ABOVE VEHICLE ROOF DECK SYSTEM

(76) Inventor: Timothy L. Ciarfello, 93 S. Jackson St., #76788, Seattle, WA (US) 98104

( * ) Notice: Subject to any disclaimer, the term of this patent is extended or adjusted under 35 U.S.C. 154(b) by 214 days.

(21) Appl. No.: 12/229,368

(22) Filed: Aug. 22, 2008

Related U.S. Application Data

(60) Provisional application No. 60/966,040, filed on Aug. 24, 2007.

(51) Int. Cl.
*B60P 3/37* (2006.01)
*B60R 13/06* (2006.01)

(52) U.S. Cl. ............... 296/162; 52/481.1; 52/650.3; 296/26.06; D12/104

(58) Field of Classification Search ............ 52/29, 52/79.5, 79.6, 169.2, 169.9, 234, 480, 481, 52/650.3; 296/26.06, 156, 162, 163, 165, 296/210; D12/104
See application file for complete search history.

(56) References Cited

U.S. PATENT DOCUMENTS

| | | | | |
|---|---|---|---|---|
| D149,981 S | * | 6/1948 | Stopa ...................... D12/104 |
| 2,924,829 A | * | 2/1960 | Mosier ....................... 52/65 |
| 3,050,330 A | * | 8/1962 | Willson .................... 296/156 |
| 3,127,213 A | * | 3/1964 | Klaasen ................. 296/193.12 |
| 3,286,414 A | * | 11/1966 | Harrison et al. ............... 52/66 |
| D219,510 S | * | 12/1970 | Tofani ..................... D12/104 |
| 3,608,954 A | * | 9/1971 | Lynd ........................ 296/164 |
| 3,719,383 A | * | 3/1973 | Ferro ....................... 296/166 |
| D227,509 S | * | 6/1973 | Walker ...................... D12/2 |
| 3,841,036 A | * | 10/1974 | Johnson ....................... 52/28 |
| 4,103,958 A | * | 8/1978 | Parent ...................... 296/165 |
| 4,202,146 A | * | 5/1980 | Adams ..................... 52/236.4 |
| 4,522,390 A | * | 6/1985 | Kudler ........................ 472/3 |
| 4,640,070 A | | 2/1987 | Moffat |
| 5,173,052 A | * | 12/1992 | Duncan, Jr. ................. 434/226 |
| 5,934,026 A | * | 8/1999 | Green ........................ 52/143 |
| 5,967,583 A | * | 10/1999 | Wishart .................... 296/156 |
| 6,237,988 B1 | * | 5/2001 | Messano ................... 296/165 |
| 6,425,625 B1 | * | 7/2002 | Messano ................... 296/156 |
| 6,601,894 B2 | * | 8/2003 | Shaw ....................... 296/24.3 |
| 6,679,543 B2 | * | 1/2004 | Messano ................... 296/175 |
| 6,840,825 B1 | * | 1/2005 | Messano ................. 440/12.52 |
| 7,093,888 B2 | | 8/2006 | Anderson et al. |
| 7,144,058 B1 | | 12/2006 | Winter |
| 7,234,759 B1 | * | 6/2007 | Alohali ..................... 296/168 |
| 2002/0125736 A1 | * | 9/2002 | Messano ................... 296/165 |
| 2003/0094827 A1 | | 5/2003 | Faludy et al. |

FOREIGN PATENT DOCUMENTS

| | | | |
|---|---|---|---|
| DE | 3117182 A1 | * | 5/1982 |
| DE | 4222981 A1 | * | 1/1994 |
| GB | 2196583 A | * | 5/1988 |
| WO | WO 9316898 A1 | * | 9/1993 |

* cited by examiner

*Primary Examiner*—Glenn Dayoan
*Assistant Examiner*—Paul A Chenevert

(57) ABSTRACT

A vehicle has a roof with a top and a floor with a connecting peripheral wall. The roof has a rearward section with small openings and a forward section with one large opening. A deck has an upper and a lower surface. The deck is located above the rearward section of the roof. Support members are vertically oriented and extend through the small openings in the roof. Each support member has a top and a bottom with each bottom coupled to the floor. Each top is coupled to the deck. The support members have a length to hold the entire deck a fixed distance above the top of the roof. The cross sectional area of each support member is a percentage of the cross sectional area of each small opening.

6 Claims, 4 Drawing Sheets

ABOVE VEHICLE ROOF DECK SYSTEM

RELATED APPLICATION

The present application is based upon Provisional Application No. 60/966,040 filed Aug. 24, 2007, the subject matter of which is incorporate herein by reference.

BACKGROUND OF THE INVENTION

1. Field of the Invention

The present invention relates to an above vehicle roof deck system and more particularly pertains to extending the available user space of recreational vehicles in a safe, convenient and economical manner. A vehicle deck is positioned above the roof of the vehicle and suitable to accommodate people and furnishings. The deck is connected to a support that transfers its weight and stress directly to the vehicle foundation. The deck is not built upon the roof and is not dependent on the roof for support. The roof and the walls that support the roof do not need strengthening to support the deck.

2. Description of the Prior Art

Recreational vehicles are a popular form of transportation, vacation travel and mobile living. Recreational vehicles include motorized units as well as travel trailers. These vehicles offer a broad spectrum of comfort and luxury to the people attracted to this lifestyle. The cost of this lifestyle increases with the size, complexity, and luxury of the vehicle. The size of a vehicle is limited by the dimensional restrictions for operation on public roads. The complexity and luxury of the vehicle is almost limitless. Luxury features in the most expensive recreational vehicles often become available in more moderately priced units.

Living space is at a premium in these vehicles. In the recent past, recreational vehicles makers have introduced slide-out rooms to increase living space. This feature is now very popular and available in both modestly priced and luxury recreational vehicles. Another feature to increase living space on these vehicles is the roof deck. The deck serves as an alternative to the common practice of setting up an outside living area on the ground near the vehicle. A roof deck not only provides additional living space, it also affords a view of the surroundings not available from ground level. The deck is also isolated from the dirt, mud, insects, and uninvited animals that might be present at ground level. A roof-top living area also provides an additional degree of security for its occupants and their possessions. Despite many attributes, the roof deck is not a commonly seen feature on recreational vehicles. Owners of conventional recreational vehicles use the roof carefully and sparingly, if at all, as a living space. Access to the roof for maintenance or service is accomplished using an external ladder or through a roof hatch. The thin, lightly constructed roof of a typical recreational vehicle is simply not designed to be used as a living area.

The exterior walls of a conventional recreational vehicle are engineered to support the roof and common roof-top accessories such as air conditioners, vents, and antennae. The walls of the vehicle are not engineered to support the added weight and stress of a roof living area. The walls of the conventional recreational vehicle are supported by the vehicle floor and frame. The floor and frame are the foundation or floor structure of the vehicle. This foundation or floor structure not only supports the roof and walls, it supports the interior furnishings, cabinetry, and appliances, plus the people and all the things they need to enjoy the vehicle. The foundation or floor structure is very strong, its importance is well understood in the recreational vehicle industry.

There are huge numbers of recreational vehicles in use, thousands more are built every year. There are clear and obvious advantages and attractions to having a living area atop these vehicles. Presently there are a small number of custom, super-luxury motor homes with this feature. There have also been attempts to incorporate a roof deck on more modest recreational vehicles. These attempts have produced fan fare and intense interest, but few sales and no continued support from vehicle builders. The shortcoming of these attempts is not lack of builder or buyer interest. The shortcoming is that the engineering built into successful, mass produced recreational vehicles is not easily compatible with a roof deck. These vehicles are built heavy and strong where needed and built light and just adequate wherever possible. Putting the weight and stress of a living area on top of the light and just adequate roof and walls will not work and is not safe. Owners and manufacturers will not be, and have not been satisfied with the ensuing structural complications. The weight and stress of a roof-top living area must be supported by the heavy and strong vehicle components.

In order to provide background information so that the invention may be completely understood and appreciated in its proper context, references are now made to a number of prior art patents and publications.

Described in U.S. Pat. No. 5,967,583 issued to Wishart, 1999, is a multi-level recreational vehicle, including a roof deck with collapsible railings, folding stairs, and a hot tub. This patent describes a very large, sophisticated and expensive vehicle.

U.S. Pat. No. 7,144,058 issued to Winter, 2006, discloses a luxury recreational vehicle with deployable stairs, a stowable hot tub and an expandable roof deck. This is a vehicle on the cutting edge of recreational vehicle design. At this very high price point, its roof deck should be more than adequate.

An invention for new or existing vehicles is disclosed in U.S. Pat. No. 6,237,988 issued to Messano, 2001. This rooftop deck for motor homes patent, makes accurate reference to the thin, lightly constructed roofs of modern motor homes. This invention uses a one-piece, seamless, fiber-resin composite sheet of suitable thickness, length and width to strengthen the roof. This patent radically and permanently alters the roof to support its many features.

Patent Application Publication No. US 2003/0094827 A1, Faludy et al., 2003, describes a rooftop deck system removably attached to the top of a recreational vehicle. The deck, including folding railings, an awning, and stairs, sits on a set of support beams attached to the roof. The patent does not address load or transverse stress imposed on the roof and walls by the deck. In an accident situation, wall failure or premature wall failure might occur, and the roof structures descend upon the vehicle interior.

A retractable deck for recreational vehicles is disclosed in U.S. Pat. No. 7,093,888 issued to Anderson, 2006. A deck is stored under the vehicle and mechanically moved into position alongside the vehicle for use as a living area. The deck sits slightly above the ground and it presents as a clean alternative to a carpet set directly on the ground. The frame of the vehicle supports the deck when it is stored under the vehicle. When the deck is extended it is supported by the vehicle frame and an adjustable stabilizer that rests on the ground. This invention provides a living area above the ground and utilizes the strong frame of the vehicle for support. This invention does not provide the elevated view or other advances of a roof deck.

U.S. Pat. No. 4,640,070 issued to Moffat, 1987, describes a method of adding extra floors onto, existing buildings. New foundations are required, columns, and a large platform truss serve as a base for building as many floors as needed above an existing building structure. This patent does not disclose, infer, or show any application of the invention on a mobile structure or vehicle.

SUMMARY OF THE INVENTION

In view of the foregoing disadvantages inherent in the known types of space expansion systems of known designs and configurations now present in the prior art, the present invention provides an improved above vehicle roof deck system. As such, the general purpose of the present invention, which will be described subsequently in greater detail, is to provide a new and improved above vehicle roof deck system and method which has all the advantages of the prior art and none of the disadvantages.

To attain this, the present invention essentially comprises an above vehicle roof deck system. First provided is a recreational vehicle. The recreational vehicle has a frame. The recreational vehicle has a forward end and a rearward end and sides. The recreational vehicle also has a roof above and a floor below. The forward end, rearward end and sides form a connecting peripheral wall between the roof and floor. The floor has an upper surface and a lower surface. A primary user space is defined by the peripheral wall, the floor and the roof. The roof has a rearward section with four small rectangular openings. The small rectangular openings have sides which are adjacent to the corners of the rearward section. The roof has a forward section. The forward section has one large rectangular opening. The large rectangular opening is adjacent to the rearward section.

A planar deck is provided. The deck is in a rectangular configuration. The deck consists of planks or deck boards welded together in sufficient numbers and constitutes a living area. The upper surface of the deck has a non-slip finish. The deck has an upper surface and a lower surface. The deck is located above the rearward section of the roof. The deck has a rear edge adjacent to the rearward end of the vehicle. The deck has a front edge adjacent to the forward section of the roof. The deck has side edges adjacent to the sides of the vehicle. A deck peripheral wall, in four sections, is welded to the sides and front edge and rear edge of the deck and adds strength to the deck and serves as a surface for attaching the railing. The deck has a collapsible railing. The railing has a free upper end. The railing has a lower end. The railing has hinges. The hinges couple the railing to the deck.

Four similarly constructed support members are provided. Each support member is vertically oriented. Each support member extends through a small opening in the roof. Each support member has a top. Each support member has a bottom. Each bottom is coupled to the floor. Four upper flanges are provided. The upper flanges couple the tops of the support members to the bottom of the deck. A beam, in two sections, is welded to the underside of the deck. Beam flanges are welded in four locations to the beam and are aligned and connected to corresponding upper flanges. The support members, if hollow, may be used for the positioning of water pipes, electrical lines, and the like from adjacent to the floor to above the deck. The support members have a length to hold the entire deck a fixed distance above the top of the roof. In this manner an intermediate air space is created. The cross sectional area of each support member is about 90 percent of the cross sectional area of each small opening. The small openings in the roof are made as small as possible to allow the supports to move during travel without touching the roof. All of the sides of each support member are equally spaced from the sides of each small opening.

Provided next is an elastomeric seal. The seal is provided between the sides of the support members and the small openings.

Further provided is a ladder. The ladder extends through the large opening. The ladder has a lower end. The lower end is supported on the floor of the vehicle beneath forward section of the roof. The ladder has a higher end. The higher end is provided in contact with the deck above the rearward section of the roof.

Provided last is a waterproof hatch. The waterproof hatch is pivotally secured to the roof adjacent to the large opening. The hatch has a hinge. In this manner the hatch is pivotable to an open orientation when the ladder is operationally oriented extending through the large opening. The hatch is pivotable to a closed orientation when the ladder is not extending through the large opening to close the vehicle from the weather.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved above vehicle roof deck system which has all of the advantages of the prior art space expansion systems of known designs and configurations and none of the disadvantages.

It is another object of the present invention to provide a new and improved above vehicle roof deck system which may be easily and efficiently manufactured and marketed.

It is further object of the present invention to provide a new and improved above vehicle roof deck system which is of durable and reliable constructions.

An even further object of the present invention is to provide a new and improved above vehicle roof deck system which is susceptible of a low cost of manufacture with regard to both materials and labor, and which accordingly is then susceptible of low prices of sale to the consuming public, thereby making such above vehicle roof deck system economically available to the buying public.

Even still another object of the present invention is to provide an above vehicle roof deck system for extending the available user space of recreational vehicles in a safe, convenient and economical manner.

Another object of the present invention is to provide a vehicle roof top living area that will not subject the vehicles roof and walls to additional stress.

Another object of the invention is to use common materials and fabrication techniques suitable for installation in new or existing vehicles across a spectrum of designs and price.

Yet another object of the invention is to enhance crash safety for the vehicle occupants. The deck is stronger than a conventional roof.

Still another object is the invention is removable, returning the vehicle to a traditional configuration.

Another object is to provide a base for mounting some accessories traditionally installed directly on the roof.

Another object of the invention is to provide for factory installation or retrofit.

Another object is to provide for safety in an accident. The deck is stronger than a conventional roof.

Lastly, it is an object of the present invention to provide a new and improved above vehicle roof deck system. A vehicle has a roof with a top and a floor with a connecting peripheral wall. The roof has a rearward section with small openings and a forward section with one large opening. A deck has an upper and a lower surface. The deck is located above the rearward section of the roof. Support members are vertically oriented and extending through the small openings in the roof. Each support member has a top and a bottom. Each bottom is coupled to the floor. Each top is coupled to the deck. The support members have a length to hold the entire deck a fixed distance above the top of the roof. The cross sectional area of each support member is a reduced percentage of the cross sectional area of each small opening.

In accordance with the present invention, a vehicle deck, suitable to accommodate people and furnishings and useful as a living area is positioned above the vehicle roof. The deck does not use the roof of the vehicle for support. A vertical support connects the deck is to the vehicle floor structure through openings in the roof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
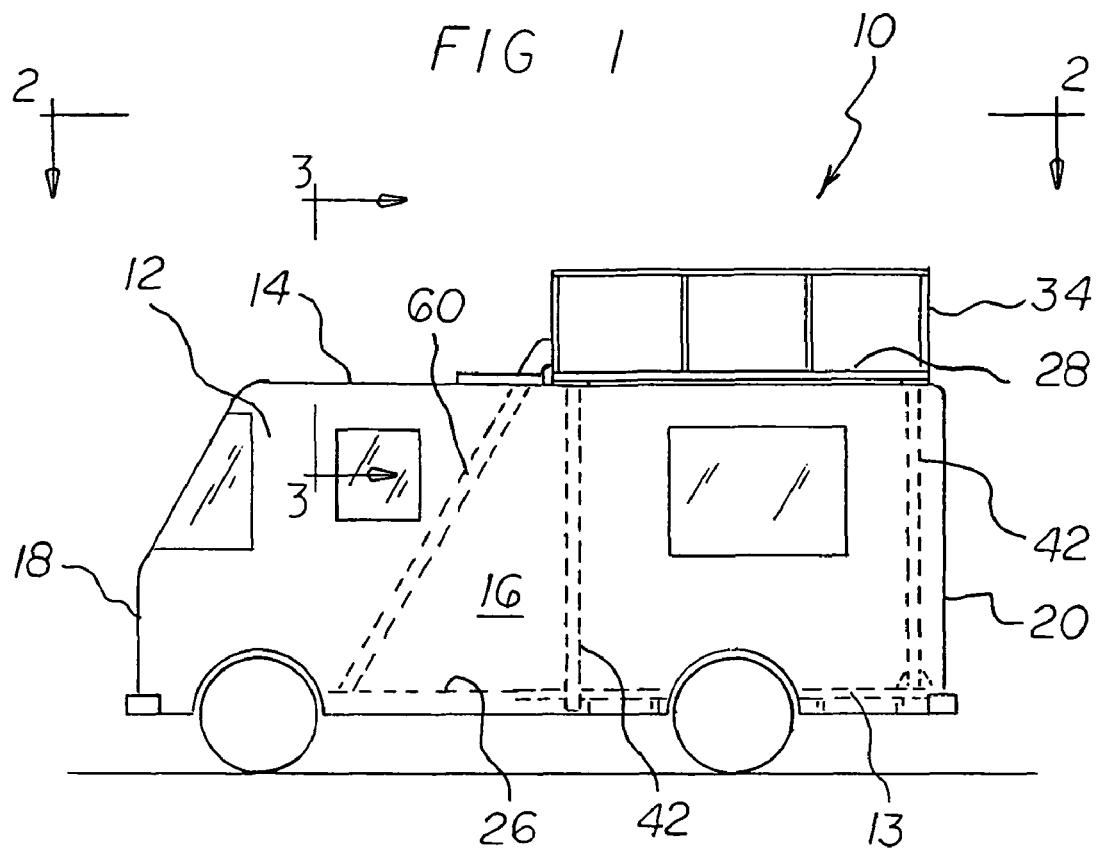
FIG. 1 is a side elevational view of an above vehicle roof deck system constructed in accordance with the principles of the present invention.

With reference now to the drawings, and in particular to FIG. 1 thereof, the preferred embodiment of the new and improved above vehicle roof deck system embodying the principles and concepts of the present invention and generally designated by the reference numeral 10 will be described.

The present invention, the above vehicle roof deck system 10 is comprised of a plurality of components. Such components in their broadest context include a vehicle, a deck and support members. Such components are individually configured and correlated with respect to each other so as to attain the desired objective.

Figure 2:
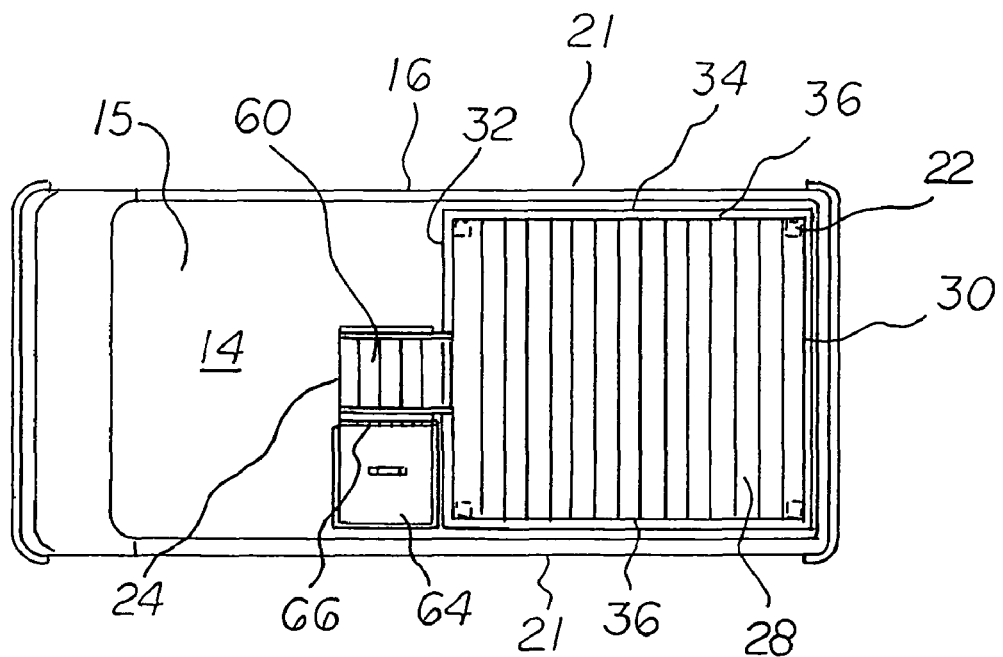
FIG. 2 is a plan view of the system taken along line 2-2 of FIG. 1.
Figure 3:
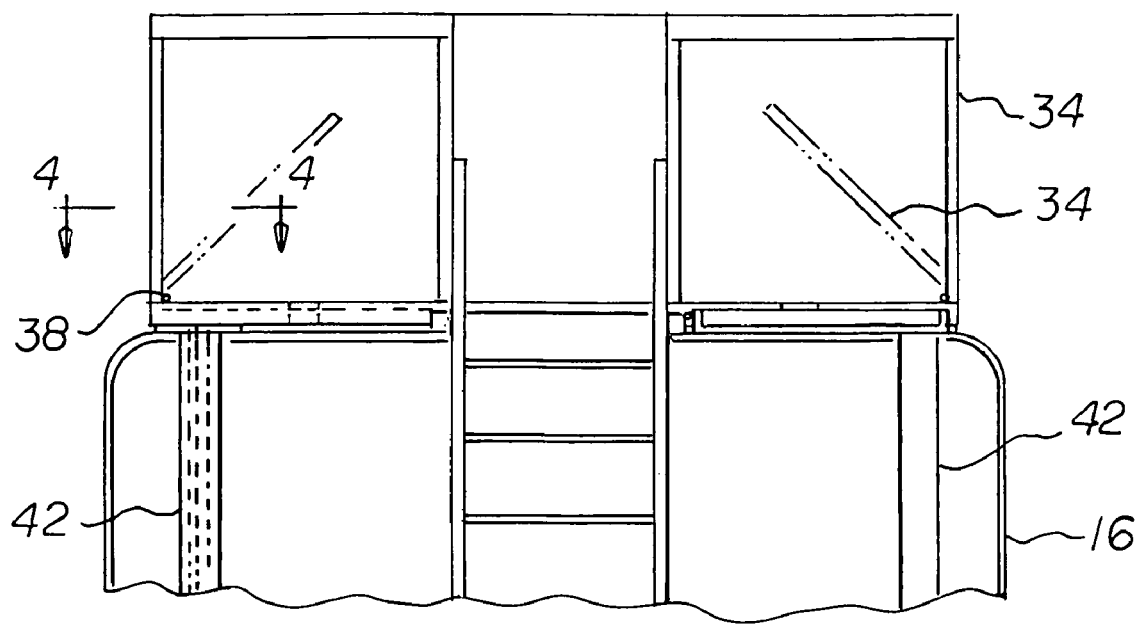
FIG. 3 is a cross sectional view taken along line 3-3 of FIG. 1.
Figure 4:
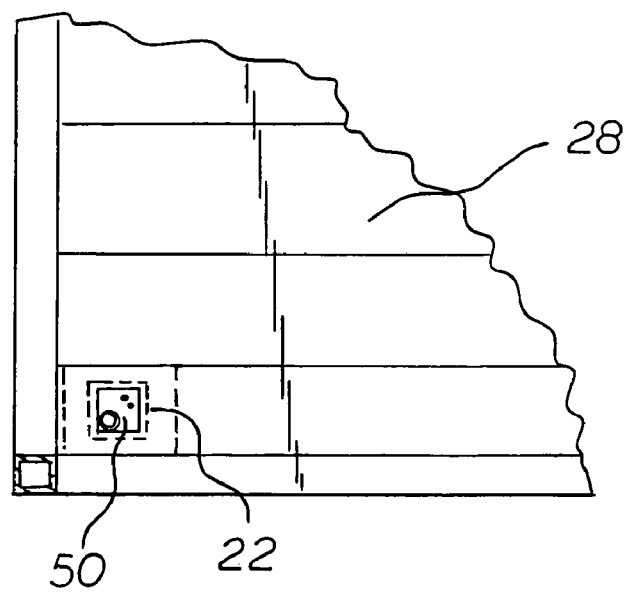
FIG. 4 is a cross sectional view taken along line 4-4 of FIG. 3.
Figure 5:
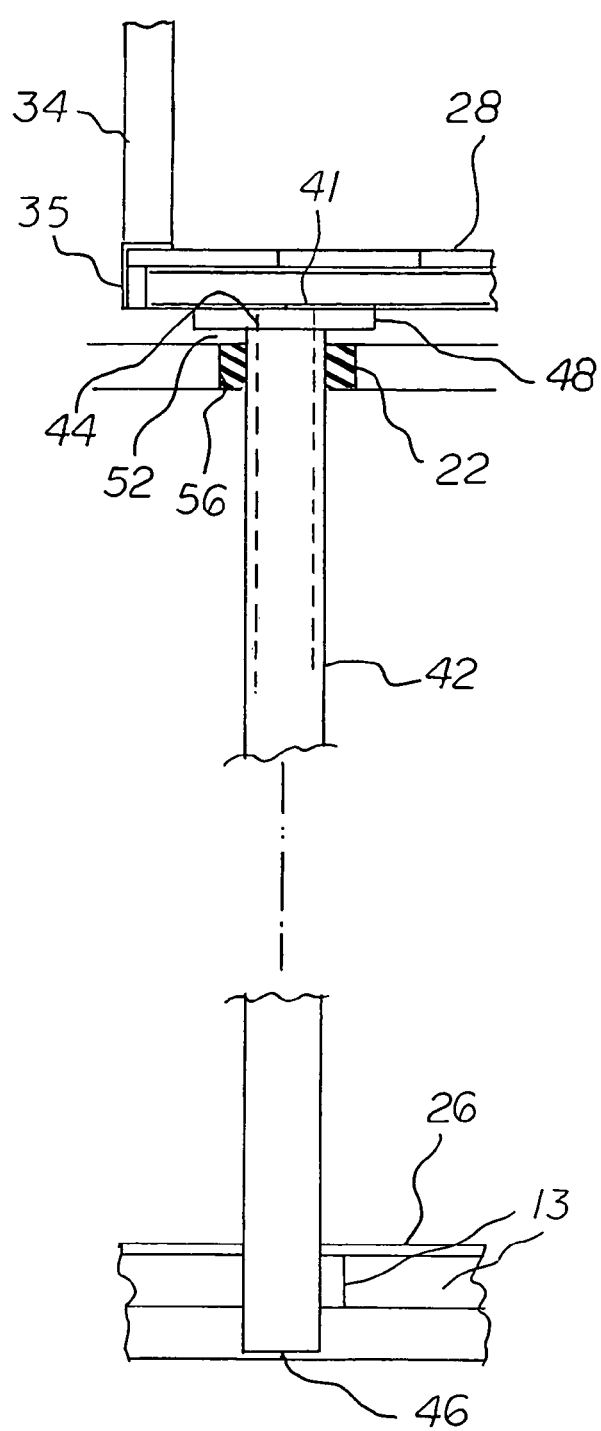
FIG. 5 is a cross sectional view illustrating one support member with its coupling through the floor to the frame below and through the roof and to the deck above.

First provided is a recreational vehicle 12. The recreational vehicle has a frame 13. The recreational vehicle has a roof 14 above with a top 15. The recreational vehicle has a floor 26 below. The recreational vehicle has a forward end 18 and a rearward end 20 and sides 21 forming a connecting peripheral wall 16. The floor has an upper surface. The floor has a lower surface. A primary user space is defined by the peripheral wall, the floor and the roof. The roof has a rearward section. The rearward section has four small rectangular openings 22. Note FIGS. 2, 4 and 5. The small rectangular openings are adjacent to the corners of the rearward section. The roof has a forward section. The forward section has one large rectangular opening 24 adjacent to the rearward section.

Figure 7:
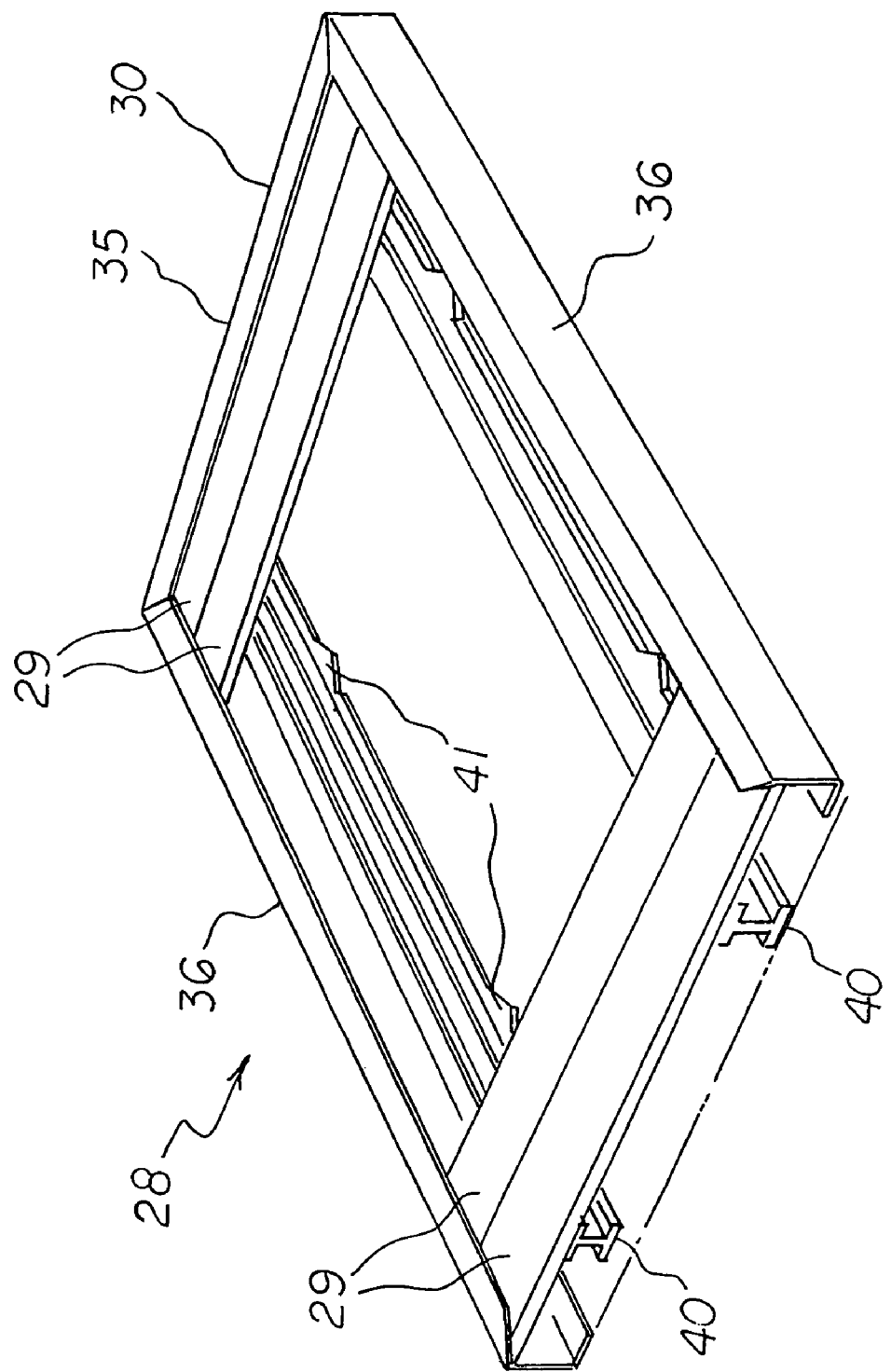
FIG. 7 is a perspective view of the deck of the invention partially broken away to show internal components.

A planar deck 28 is provided. Note in particular FIGS. 1 and 7. The deck is in a rectangular configuration. The deck has an upper surface. The deck has a lower surface. The deck is located above the rearward section of the roof. The deck consists of planks 29 welded together. The deck has a rear edge 30. The rear edge is provided adjacent to the rearward end of the vehicle. The deck has a front edge 32. The front edge is adjacent to the forward section of the roof. The deck has side edges 36 adjacent to the sides of the vehicle. A deck peripheral wall 35, in four sections, is welded to the sides and front edge and rear edge of the deck and adds strength to the deck and serves as a surface for attaching the railing. The deck has a collapsible railing 34. The railing has a free upper end. The railing has a lower end. The railing has hinges 38. The hinges couple the railing to the deck.

Returning now to FIG. 1, four similarly constructed support members 42 are provided. Each support member is vertically oriented. Each support member extends through a small opening in the roof. Each support member has a top 44. Each support member has a bottom 46. Each bottom extends through the floor 26 and into the frame 13. Four upper flanges 48 are provided. A beam 40, in two sections, is welded to the underside of the deck. Beam flanges 41 are welded in four locations to the beam and are aligned and connected to corresponding upper flanges 48. Note FIG. 5. The upper flanges 48 couple the tops of the support members 42 to the bottom of the deck. Each support member is hollow for the positioning of water lines, electrical lines, and the like 50 adjacent to the floor to above the deck. The support members have a length to hold the entire deck at a fixed distance above the top of the roof. In this manner an intermediate air space 52 is created. The cross sectional area of each support member is about 90 percent of the cross sectional area of each small opening. The small openings in the roof are made as small as possible to allow the supports to move during travel without touching the roof. All of the sides of each support member are equally spaced from the sides of each small opening.

Provided next is an elastomeric seal 56. The seal is provided between the sides of the support members and the small openings.

Further provided is a ladder 60. The ladder extends through the large opening. The ladder has a lower end. The lower end is supported on the floor of the vehicle beneath the forward section of the roof. The ladder has a higher end. The higher end is provided in contact with the deck above the rearward section of the roof.

Provided last is a waterproof hatch 64. The waterproof hatch is pivotally secured to the roof adjacent to the large opening. The hatch has a hinge 66. In this manner the hatch is pivotable to an open orientation when the ladder is operationally oriented extending through the large opening. The hatch is pivotable to a closed orientation when the ladder is not extending through the large opening to close the vehicle from the weather.

Figure 6:
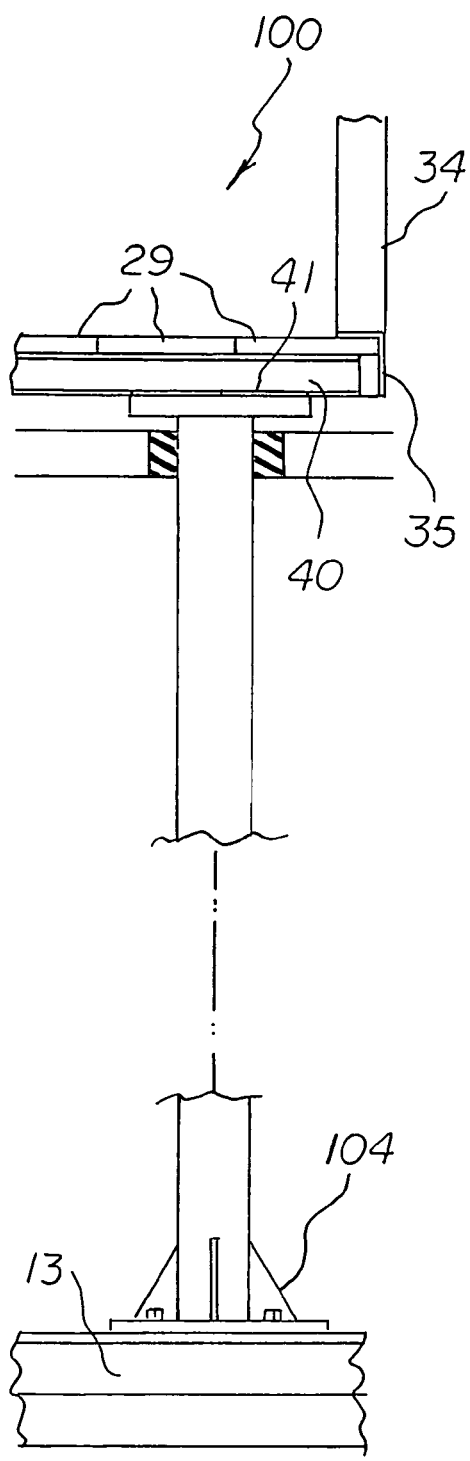
FIG. 6 is a cross sectional view similar to FIG. 5 but illustrating an alternate embodiment of the invention.

Reference is now made to an alternate embodiment 100 of the present invention shown in FIG. 6. The bottom of each support member includes a coupling component 104. The coupling component attaches the support members to the floor. The coupling component 104, of a fabricated shape, is connected to the floor 26. Coupling component 104 will also serve to facilitate the joining of dissimilar materials when needed. For example, support member 42, if made of aluminum, could be welded directly to the floor 26 also made of aluminum. However, if floor 26 is made of wood or steel, direct welding may be impossible or unlikely.

FIG. 1 shows a recreational vehicle 12. While the preferred embodiment displays a motor home, other embodiments are contemplated including vehicles such as trailers. The recreational vehicle 12 includes a roof 14 and a peripheral wall 16, a hatch 64, and a removable ladder 60. The deck 28 is positioned above the roof 14 a predetermined distance sufficient to assure loads and stress from the deck are not transferred to roof 14. The deck is rectangular in shape and suitable to accommodate people and furnishings. The deck is specifically useful as a living area. One skilled in the art will appreciate that different sizes and shapes of the deck fall within the scope of the invention.

Because of the height of deck 28 above ground level a wall, fence or a railing is required to be positioned around the living area perimeter of the deck. A collapsible railing 34 is provided for safety and folds down to reduce the overall height of the vehicle. Properly designed and positioned furnishings, such as seats or tables, could be used to replace or complement the railing 34 as a means to prevent falling from the deck 28.

In FIG. 1, a side view of the vehicle 12 with the deck 28, reveals interior detail of the vehicle 12, including the peripheral wall 16 of the vehicle and the vehicle floor 26. The floor 26 is engineered to support the peripheral wall 16 and other interior walls, furnishings, appliances and cabinetry, plus people and other items (not shown) they need to enjoy the vehicle. The floor 26, peripheral wall 16, and roof 14 are supported by a frame 13.

The invention uses a plurality of support members built upon floor 26 and the frame 13 of the vehicle 12. In one embodiment a coupling component 104 is secured to the floor for providing an attachment point for erecting each support member 42. The coupling component has a generally flat lower flange of rigid material bolted directly to floor 26. The coupling component is suitably sized to disperse the weight and stress of supporting the deck 28 across the floor 26 and underlying frame elements. The coupling component may contain a strut, brace or gusset to add stability and reinforcement to the connection.

Support members 42 extend upward through the roof 14 of the vehicle 12 and are welded to the upper flanges 48. The top 44 of support member 42 is shown welded to the deck 28. The top of the support member is a fixture for mounting the deck 28 on the support member 42 above the roof 14. The support members 42 are disposed to provide stability to the deck 28. The support members 42 are rectangular tubes. The interior of the support members are useful as a conduit for carrying cable, wire, or tubing from locations within vehicle 12, to accessories on or above the roof 14, thereby reducing the number of small openings in the roof. One skilled in the art will recognize that the support members 42 could be round tubes, I-beams or any other suitable shape. The support members 42 could be comprised of connectable sections to facilitate installation. The support members 42 could also be erected upon a load bearing interior structure, such as a properly reinforced counter top or wall. One skilled in the art will appreciate that the support members 42 can be utilized in any number or in any suitable location depending on the specific installation.

Locating the support members 42 adjacent to or within walls or cabinetry should be considered to maximize livability within the vehicle 12. An important feature of the present invention is that the deck 28 is structurally independent of the roof 14. The rectangular openings 22 for each support member 42 are large enough to prevent contact between the support member 42 and the roof 14, thus not transferring any load or stress to the roof 14. An elastomeric seal fills the gap between the support member 42 and the roof structure 14.

The deck 28 consists of planks or deck boards, welded together in sufficient numbers, and constitutes the living area. The upper surface of the deck has a non-slip finish. A peripheral wall, in four sections, is welded to the sides and ends of the deck. The front edge 32, rear edge 30 and side edges 36 add strength to the deck and serve as a surface for attaching the railing 34. A beam 40, in two sections, may be welded to the underside of deck 28. A beam flange 41, welded in four locations on the beam, may be aligned and connected to a corresponding upper flange 48 on support member 42. Bolting the beam flange to the upper flange will facilitate initial installation and when needed, removal of the deck 28 for service or repair to the roof 14. Many variations and designs of deck 28 will suit this invention.

The above vehicle roof deck system in accordance with the preferred embodiment is made primarily of aluminum components. Welding is used to connect components except as noted in the description. Other materials and connectors known in the art are suitable and within the scope of the invention.

In the event of an accident when the vehicle is underway, the present invention, which was created to support roof-top living when parked, also serves as a barrier to protect interior occupants. The rigid connection of the floor 26 and the frame 13 to the deck 28, creates a re-enforced zone within the vehicle 12. Deck 28 will provide a substantial improvement to protect against foreign object intrusion from above the thin and light roof 14, while the support members will add to the protection provided by the peripheral wall 16 of the vehicle. The degree of this enhanced safety will be determined by the builder.

The above vehicle roof deck, its components and accessories, can be made from any suitable material such as steel, fiberglass, wood or composites. The components can be connected by gluing, bonding, nailing, welding, screwing or bolting. The preferred embodiment described above is primarily aluminum. Welding is used to connect components whenever possible except as noted in the detailed description. Aluminum is appropriately strong, light weight and well known in the industry.

The preferred embodiment illustrated is not intended to be exhaustive or to limit the invention to the precise form disclosed. The present invention is intended to embrace all such alternatives, modifications and variants which fall within the scope of the appended claims.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An above vehicle roof deck system comprising:
    a vehicle having a roof with a forward section and a rearward section and having a top and a floor with a connecting peripheral wall, the roof having a plurality of openings including small openings in the rearward section and one large opening in the forward section;
    a deck with an upper surface and a lower surface located above the rearward section of the roof; and
    support members being vertically oriented and extending through the small openings in the roof, each support member having a top coupled to the deck and a bottom coupled to the floor, the support members having a length to hold the deck a fixed distance above the top of the roof, the cross sectional area of each support member being a reduced percentage of the cross sectional area of each opening.

2. An above vehicle roof deck system comprising:
    a vehicle having a roof with a forward section and a rearward section and having a top and a floor with a connecting peripheral wall, the roof having a plurality of openings;
    a deck with an upper surface and a lower surface located above the roof;
    support members being vertically oriented and extending through the openings in the roof, each support member having a top and a bottom with each support member coupled to the floor, the support members having a length to hold the deck a fixed distance above the top of the roof, the cross sectional area of each support member being a reduced percentage of the cross sectional area of each opening; and
    an elastomeric seal between sides of the support members and the openings.

3. An above vehicle roof deck system comprising:
    a vehicle having a roof with a forward section and a rearward section and having a top and a floor with a connecting peripheral wall, the roof having a plurality of openings including small openings and a large opening;
    a deck with an upper surface and a lower surface located above the roof;
    support members being vertically oriented and extending through the openings in the roof, each support member having a top and a bottom with each support member coupled to the floor, the support members having a length to hold the deck a fixed distance above the top of the roof, the cross sectional area of each support member being a reduced percentage of the cross sectional area of each opening; and
    a ladder extending through the large opening with a lower end supported on the floor of the vehicle and a higher end in contact with the deck.

4. The system as set forth in claim 3 wherein the lower end of the ladder is supported on the floor of the vehicle beneath a forward section of the roof and the higher end is in contact with the deck above a rearward section of the roof.

5. An above vehicle roof deck system comprising:
    a vehicle having a roof with a forward section and a rearward section and having a top and a floor with a connecting peripheral wall, the roof having a plurality of openings;
    a deck with an upper surface and a lower surface located above the roof; and
    support members being vertically oriented and extending through the openings in the roof, each support member having a top and a bottom with each support member coupled to the floor, the support members having a length to hold the deck a fixed distance above the to of the roof, the cross sectional area of each support member being a reduced percentage of the cross sectional area of each opening wherein the bottom of each support member includes a coupling component attaching the support member to the floor.

6. An above vehicle roof deck system for extending the available user space of recreational vehicles in a safe, convenient and economical manner, the system comprising, in combination:
    a recreational vehicle having a frame, a forward end and a rearward end and sides, a roof above and a floor below; the roof having a top; the forward end, rearward end and sides forming a connecting peripheral wall; the floor having an upper surface and a lower surface; the recreational vehicle having a primary user space defined by the peripheral wall, the floor and the roof; the roof having a rearward section with four small rectangular openings having sides and being adjacent to the corners of the rearward section; the roof having a forward section having one large rectangular opening adjacent to the rearward section;
    a planar deck in a rectangular configuration with an upper surface and a lower surface located above the rearward section of the roof, the deck consisting of planks welded together, the deck having a rear edge adjacent to the rearward end of the vehicle, the deck having a front edge adjacent to the forward section of the roof, the deck having side edges adjacent to the side walls of the vehicle, a collapsible railing with a free upper end and a lower end with hinges coupling the railing to the upper surface of the deck;
    a beam, in two sections, welded to the underside of the deck with a beam flange welded in four locations to the beam;
    four similarly constructed support members, each support member being vertically oriented and extending through one of the four small openings in the roof, each support member having sides and a top and a bottom with each bottom coupled to the floor, four upper flanges coupling the tops of the support members to the lower surface of the deck with the beam flanges aligned and connected to corresponding upper flanges;

each support member being hollow for the positioning of transmission lines from adjacent to the floor to above the deck, the support members having a length to hold the entire deck a fixed distance above the top of the roof and create an intermediate air space, the cross sectional area of each support member being about 90 percent of the cross sectional area of each small opening with all of the sides of each support member equally spaced from the sides of each small opening;

an elastomeric seal between the sides of the support members and the small opening;

a ladder extending through the large opening with a lower end supported on the floor of the vehicle beneath the forward section of the roof and a higher end in contact with the deck above the rearward section of the roof; and a waterproof hatch pivotally secured to the roof adjacent to the large opening, the hatch having a hinge to pivot the hatch to an open orientation when the ladder is operationally oriented extending through the large opening, the hatch being pivotable to a closed orientation when the ladder is not extending through the large opening to close the vehicle from the weather.

* * * * *